US005270141A

United States Patent [19]

Ohtani et al.

[11] Patent Number: 5,270,141

[45] Date of Patent: Dec. 14, 1993

[54] IMAGE-HOLDING MEMBER, AND ELECTROPHOTOGRAPHIC APPARATUS, APPARATUS UNIT, AND FACSIMILE MACHINE EMPLOYING THE SAME

[75] Inventors: Noriko Ohtani, Yokohama; Teigo Sakakibara, Tokyo, both of Japan

[73] Assignee: Canon Kabushiki Kaisha, Tokyo, Japan

[21] Appl. No.: 825,499

[22] Filed: Jan. 24, 1992

[30] Foreign Application Priority Data

Jan. 25, 1991 [JP] Japan ..................... 3-7756
Jan. 25, 1991 [JP] Japan ..................... 3-7757
Jan. 25, 1991 [JP] Japan ..................... 3-7767

[51] Int. Cl.[5] .................... G03G 5/14; H04N 1/23

[52] U.S. Cl. .................... 430/62; 430/63; 355/211; 358/300; 358/302

[58] Field of Search .................... 430/60, 62, 64, 63

[56] References Cited

U.S. PATENT DOCUMENTS

| | | | |
|---|---|---|---|
| 3,795,516 | 3/1974 | Stahr et al. | 430/64 X |
| 4,282,294 | 8/1981 | Lee et al. | 430/1 |
| 4,444,862 | 4/1984 | Yagi et al. | 430/67 |
| 4,895,783 | 1/1990 | Lee et al. | 430/66 |
| 5,135,834 | 8/1992 | Hawatani et al. | 430/60 X |

FOREIGN PATENT DOCUMENTS

| | | |
|---|---|---|
| 424952 | 5/1991 | European Pat. Off. . |
| 51-126149 | 11/1976 | Japan . |
| 52-10138 | 1/1977 | Japan . |
| 52-20836 | 2/1977 | Japan . |
| 52-25638 | 2/1977 | Japan . |
| 53-89435 | 8/1978 | Japan . |
| 54-36738 | 2/1979 | Japan . |
| 55-103556 | 8/1980 | Japan . |
| 55-143564 | 11/1980 | Japan . |
| 56-60448 | 5/1981 | Japan . |
| 58-95351 | 6/1983 | Japan . |
| 58-106549 | 6/1983 | Japan . |

OTHER PUBLICATIONS

Teuscher, "Crosslinked Interfacial Materials for Photoreceptors", Xerox Discl. Jour., vol. 10, No. 1 Jan./Feb. 1985.

Patent Abstracts of Japan, vol. 12, No. 156 (P-701)[3003], May 13, 1988.

Patent Abstracts of Japan, vol. 14, No. 389 (P-1095), Aug. 22, 1990.

*Primary Examiner*—Roland Martin
*Attorney, Agent, or Firm*—Fitzpatrick, Cella, Harper & Scinto

[57] ABSTRACT

The present invention provides an excellent image-holding member, comprising an electroconductive support, a resin layer formed on the support, and an interlayer provided between the support and the resin layer, said interlayer containing a reaction product of an acetal resin and an organometallic complex compound.

19 Claims, 2 Drawing Sheets

IMAGE-HOLDING MEMBER, AND ELECTROPHOTOGRAPHIC APPARATUS, APPARATUS UNIT, AND FACSIMILE MACHINE EMPLOYING THE SAME

BACKGROUND OF THE INVENTION

1. Field of the Invention

The present invention relates to an image-holding member, more particularly to an image-holding member having an improved interlayer.

The present invention also relates to an electrophotographic apparatus, an apparatus unit, and a facsimile machine employing the above image-holding member.

2. Related Background Art

An image-holding member such as an electrophotographic photosensitive member which is repeatedly used for image formation is required to be capable of stably producing superior images with steady image density without fogging. The stabilities of the dark-area potential and the light area . potential as well as the stability of the sensitivity are highly important therefor.

In the modern electrophotographic photosensitive members which are constituted of an electroconductive support, a charge-generating layer formed thereon, and a charge-transporting layer formed further thereon, the charge-generating layer is usually extremely thin, having a thickness of 0.5 μm or thereabout. Accordingly, the photosensitive member is liable to cause irregularity in sensitivity and potentials owing to defects such as stains, adhering matters, and scratches on the electroconductive support.

For the purpose of avoiding such disadvantages, it was proposed to provide an interlayer between a supporting member and a photosensitive layer, the interlayer having the functions of improving carrier injection from the supporting layer to the photosensitive layer, improving adhesion of the photosensitive layer to the supporting member, improving coating properties of the photosensitive layer, and covering defective spots on the supporting member.

Heretofore, known materials for the interlayer include polyamides (Japanese Laid-Open Patent Application Nos. 46-47344, 52-25638, and 58-95351), polyesters (Japanese Laid-Open Patent Application Nos. 52-20836, and 54-26738), polyurethane (Japanese Laid-Open Patent Application Nos. 49-10044, and 53-89435), casein (Japanese Laid-Open Patent Application No. 55-103556), polypeptides (Japanese Laid-Open Patent Application No. 53-48523), polyvinyl alcohols (Japanese Laid-open Patent Application No. 52-100240), polyvinylpyrrolidone (Japanese Laid-Open Patent Application No. 48-30936), vinyl acetate-ethylene copolymers (Japanese Laid-Open Patent Application No. 48-26141), maleic anhydride ester polymer (Japanese Laid-Open Patent Application No. 52-10138), polyvinylbutyrals (Japanese Laid-Open Patent Application Nos. 57-90639, and 58-106549), and quaternary ammonium salt-containing polymers (Japanese Laid-Open Patent Application Nos. 51-126149, and 56-60448), ethylcelluloses (Japanese Laid-Open Patent Application No. 55-143564), and so forth.

However, the electrophotographic photosensitive member having such an interlayer may vary in its electrophotographic properties depending on the environmental conditions such as temperature and humidity.

For example, the electric resistance of the interlayer tends to rise at a low temperature and a low humidity.

Accordingly, electric charge is liable to remain in the interlayer to cause a rise in the residual potential and the light area potential, which tends to caused fogging of the formed images (in positive development) or to lower the image density (in reversal development). On the contrary, the electric resistance of the interlayer tends to fall at a high temperature and a high humidity. Accordingly, carrier injection from the supporting material to the photosensitive member is facilitated which results in decrease of the dark portion potential. Such a decrease which will lower the image density (in positive development). or will lead to formation of black-dot type defects (black spots) or fogging (in reversal development).

Furthermore, if the interlayer does not have sufficient solvent-resistance, the interlayer may dissolve or swell when a photosensitive layer is laminated causing deterioration of the electrophotographic properties.

With the demand for higher image quality in recent years, electrophotographic photosensitive members are being investigated which have stabler electrophotographic properties under a variety of environmental conditions from low-temperature and low-humidity to high-temperature and high-humidity.

The situation is the same for the other image-holding members used for display apparatuses, recording apparatuses, and light printing and plate-making.

SUMMARY OF THE INVENTION

The present invention intends to provide an image-holding member which is capable of giving superior images stably in repeated image formation.

The present invention also intends to provide an image-holding member which is capable of stably giving superior images under environmental conditions ranging from low-temperature and low-humidity to high-temperature and high-humidity.

The present invention further intends to provide an electrophotographic photosensitive member, an apparatus unit, and a facsimile machine employing the above image-holding member.

The present invention provides an image-holding member, comprising an electroconductive support, a resin layer formed on the support, and an interlayer, provided between the support and the resin layer, the interlayer containing a reaction product of an acetal resin and an organometallic complex compound.

The present invention also provides an electrophotographic photosensitive member, an apparatus unit, and a facsimile machine employing the above image-holding member.

DESCRIPTION OF THE PREFERRED EMBODIMENT

Figure 1:
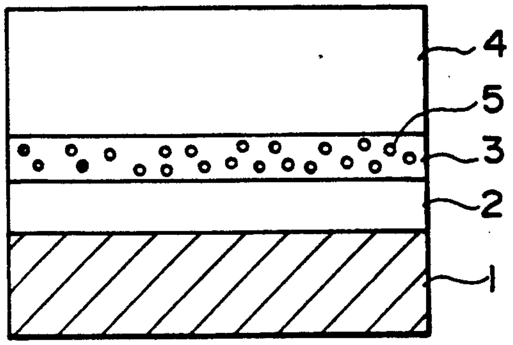
FIG. 1 illustrates an example of the layer constitution of the image holding member of the present invention.

The image-holding member of the present invention comprises an interlayer containing a reaction product of an acetal resin with an organometallic complex compound. This reaction product is formed by mixing the acetal resin and &he organometallic complex compound in a suitable solvent and heating the mixture to cause a reaction of the hydroxyl group of the acetal resin with the central metal or a reactive group linked to or coordinated with the central metal.

The acetal resin employed in the present invention has the structure represented by the general formula below:

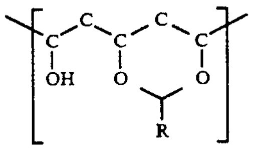

where R is a hydrogen atom, a substituted or unsubstituted alkyl group, a substituted or unsubstituted cycloalkyl group, a substituted or unsubstituted aryl group, or a substituted or unsubstituted aromatic heterocyclic group The alkyl group includes methyl, ethyl, propyl, etc. The cycloalkyl group includes cyclopropyl, cyclobutyl, cyclopentyl, cyclohexyl, etc. The aryl group includes phenyl, naphthyl, etc. The aromatic heterocyclic group includes pyridyl, etc.

The organometallic complex compound employed in the present invention includes particularly preferably those having the structure represented by any of the formulas (I) to (XII) where the broken line in the formula represents a coordinate bond:

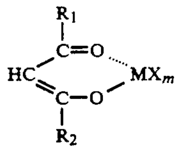

(I)

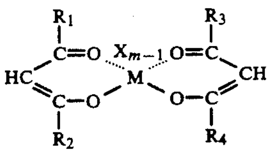

(II)

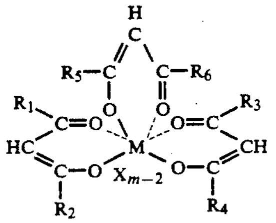

(III)

-continued

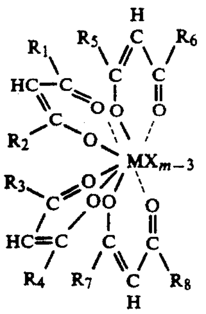

(IV)

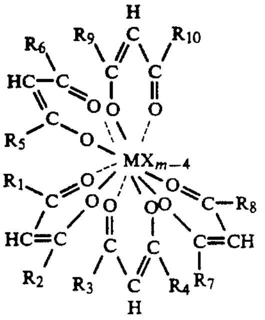

(V)

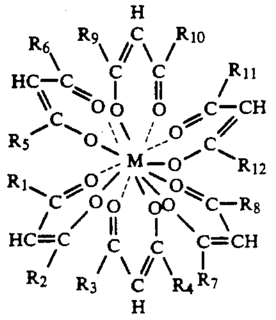

(VI)

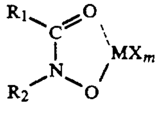

(VII)

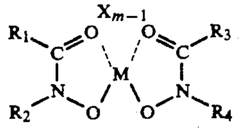

(VIII)

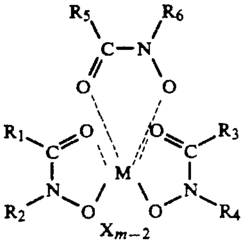

(IX)

-continued

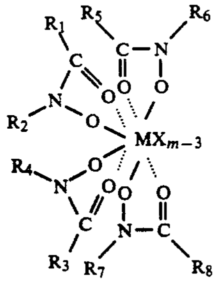

(X)

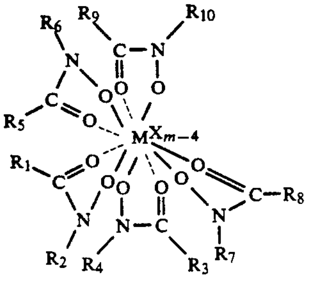

(XI)

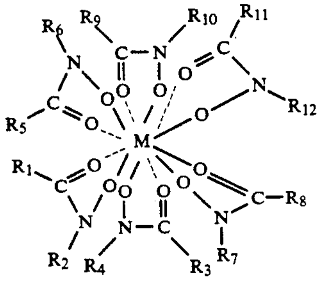

(XII)

wherein M is a metal atom selected from the group of aluminum, titanium, silver, barium, cobalt, chromium, copper, europium, iron, potassium, lanthanum, magnesium, manganese, molybdenum, nickel, palladium, radon, tin, lead, vanadium, zinc, and zirconium, or an oxide, a sulfide, or a halide of the metal; $R_1$, $R_2$, $R_3$, $R_4$, $R_5$, $R_6$, $R_7$, $R_8$, $R_9$, $R_{10}$, $R_{11}$, and $R_{12}$ are independently a hydrogen atom, an alkyl group, an alkenyl group, an alkoxy group, an aryl group, a cycloalkyl group, a cycloalkyl group or an $OR_{13}$ group (where $R_{13}$ is alkenyl, aryl, or cycloalkyl), which groups may be substituted; X is water, a carbonyl group, an alkyl group, an alkoxy group, a cycloalkyl group, or a cycloalkenyl group, which may be substituted; and m is 0, 1, 2, 3, 4, or 5.

The alkyl group includes methyl, ethyl, and propyl; the alkenyl group includes propenyl, butenyl, pentenyl, and hexenyl; the alkoxy group includes methoxy, ethoxy, and propoxy; the aryl group includes phenyl and naphthyl; the cycloalkyl group includes cyclopropyl, cyclobutyl, cyclopentyl, and cyclohexyl; and the cycloalkenyl group includes cyclobutenyl, cyclopentenyl, cyclohexenyl, cycloheptenyl, and cyclooctenyl.

M is preferably aluminum or titanium from among the metals mentioned above, particularly preferably aluminum.

Specific examples of the organometallic complex compound used in the present invention are listed below without limiting the compound in any way.

| No | Structural formula |
|---|---|
| 1 | 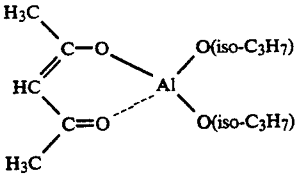 |
| 2 | 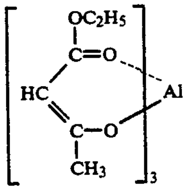 |
| 3 | 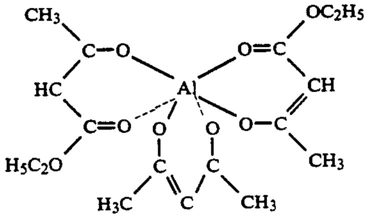 |
| 4 | 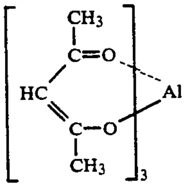 |
| 5 | 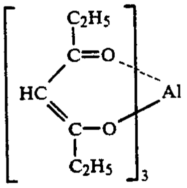 |
| 6 | 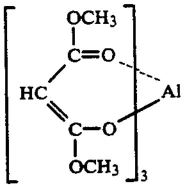 |
| 7 | 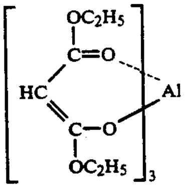 |
| 8 | 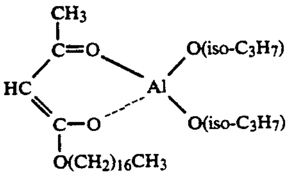 |

-continued
| No | Structural formula |
| --- | --- |
| 9 | 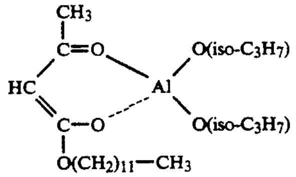 |
| 10 | 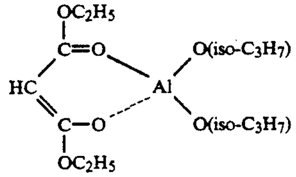 |
| 11 | 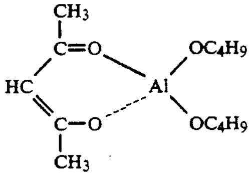 |
| 12 | 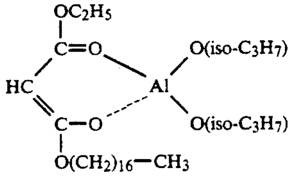 |
| 13 | 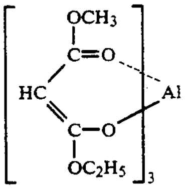 |
| 14 | 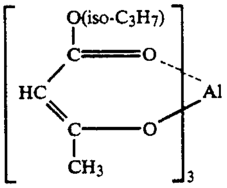 |
| 15 | 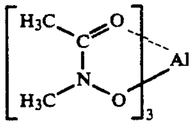 |
| 16 | 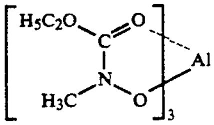 |
-continued
| No | Structural formula |
| --- | --- |
| 17 | 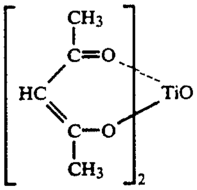 |
| 18 | 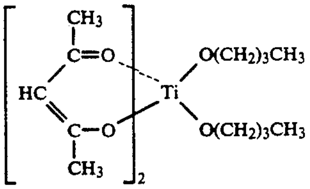 |
| 19 | 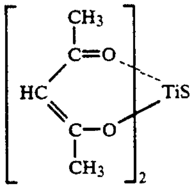 |
| 20 | 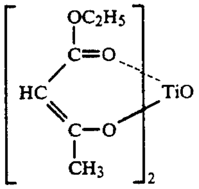 |
| 21 | 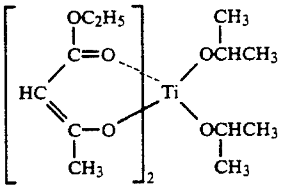 |
| 22 | 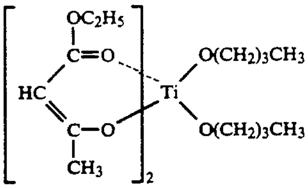 |
| 23 | 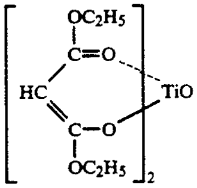 |
| 24 | 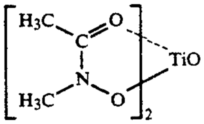 |

-continued
| No | Structural formula |
|---|---|
| 25 | 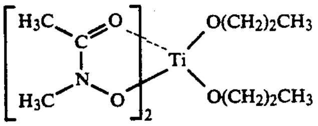 |
| 26 | 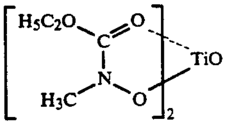 |
| 27 | 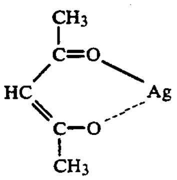 |
| 28 | 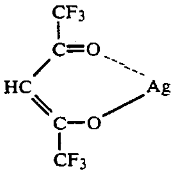 |
| 29 | 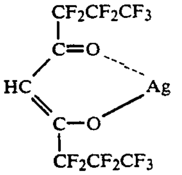 |
| 30 | 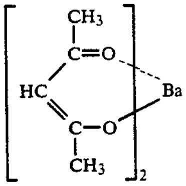 |
| 31 | 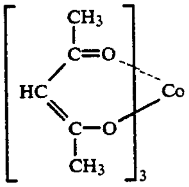 |
| 32 | 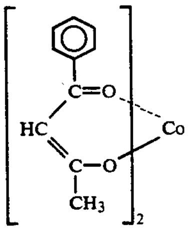 |
-continued
| No | Structural formula |
|---|---|
| 33 | 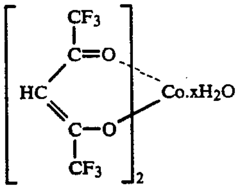 |
| 34 | 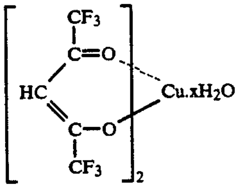 |
| 35 | 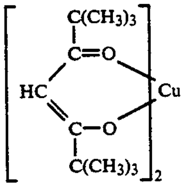 |
| 36 | 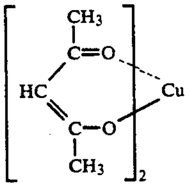 |
| 37 | 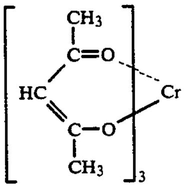 |
| 38 | 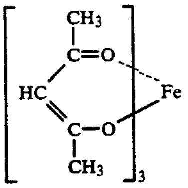 |
| 39 | 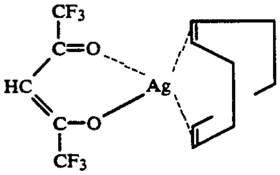 |
| 40 | 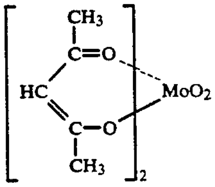 |

-continued
| No | Structural formula |
|---|---|
| 41 | 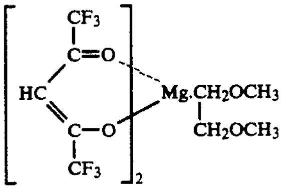 |
| 42 | 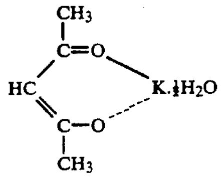 |
| 43 | 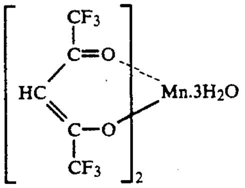 |
| 44 | 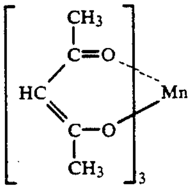 |
| 45 | 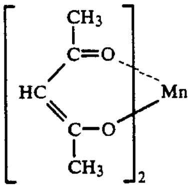 |
| 46 | 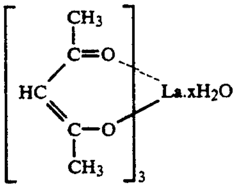 |
| 47 | 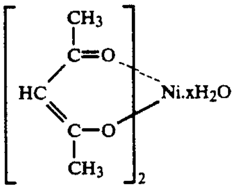 |
-continued
| No | Structural formula |
|---|---|
| 48 | 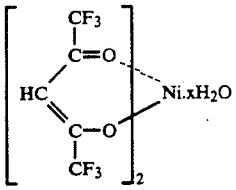 |
| 49 | 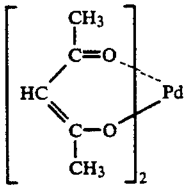 |
| 50 | 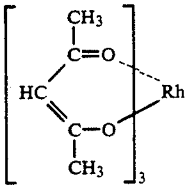 |
| 51 | 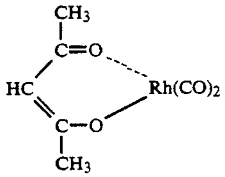 |
| 52 | 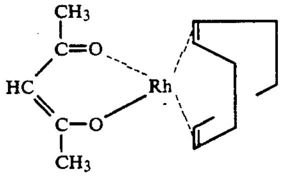 |
| 53 | 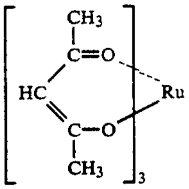 |
| 54 | 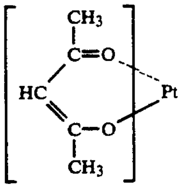 |
| 55 | 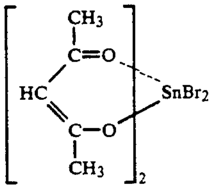 |

-continued

| No | Structural formula |
|---|---|
| 56 | 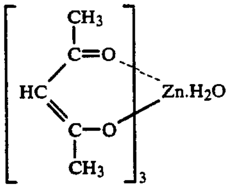 |
| 57 | 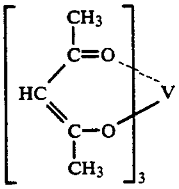 |
| 58 | 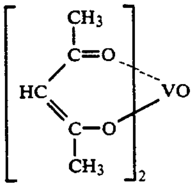 |
| 59 | 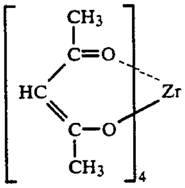 |
| 60 | 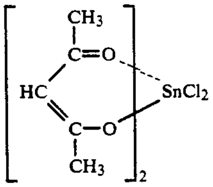 |
| 61 | 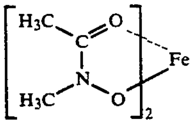 |
| 62 | 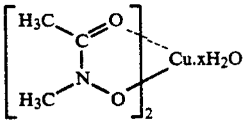 |
| 63 | 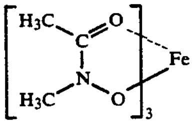 |
| 64 | 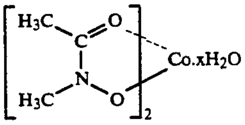 |

-continued

| No | Structural formula |
|---|---|
| 65 | 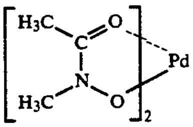 |

X = number of crystal water

Among these compounds, No.1, No.3, No.4 and No.7 are specifically preferable.

Synthesis examples of the reaction product of the acetal resin with the organometallic complex compound are shown below.

SYNTHESIS EXAMPLE 1

To a 10% by weight solution of a butyl resin (S-LEC Bx-1, made by Sekisui Chemical Co.. Ltd.. butyralation degree: 66%) in methyl ethyl ketone, the exemplified organometallic complex compound No. 3 was added at a ratio (Moles of OH group of butyral resin)/(Moles of organic aluminum complex) of 5/1. This solution was applied on a KBr plate, and was dried at 150° C. for one hour. The infrared absorption spectrum of the resulting sample shows that the absorption peak of the hydroxyl group of the butyral diminished after the addition of the organometallic complex compound.

SYNTHESIS EXAMPLE 2 AND 3

The reaction product was synthesized and evaluated in the same manner as in Synthesis Example 1 except that the exemplified compound 19 or 29 was used. Each of the products exhibited less absorption peak of the hydroxyl group of the butyral than that before addition of the organometallic complex compound.

The structure of the reaction product of an acetal resin and the organometallic complex compound depends on the structure of the acetal resin and the structure of the organometallic complex compound. The two reactants may link together in two ways: in one case, the metal atom in the organometallic complex compound links to only one coordination group, namely one hydroxyl group, and in the other case, the metal arom forms a chelate ring by reacting with plural coordination groups. In the both cases, the r®action products of the acetal resin with the organometallic complex compound takes the energetically most stable structure under the influences of steric hindrance around the coordination site, distribution of electrons, the kind of the solvent, and steric configuration required by the metal atom. A cross-linked structure is particularly stable.

The reaction product of an acetal resin and an organometallic complex compound of the present invention is less liable to cause coating defects on coating film formation, and exhibits higher adhesiveness to an electroconductive support, in comparison with the single acetal resin.

Further, the reaction product of an acetal resin and an organometallic complex compound of the present invention is much more resistant to organic solvents than a single acetal resin, allowing the wide selection for the coating liquid used to laminate resin layers, namely a photosensitive layer and a dielectric layer, on the interlayer. Therefore, even if the interlayer is composed of a combination of materials which usually dissolve or swell giving poor electrophotographic characteristics, according to the present invention the resulting image-holding member has excellent properties, and wider varieties of photosensitive layers and dielectric layers can be formed.

Furthermore, the present invention effectively prevents the changes of the properties, due to environmental conditions, such as the rise of residual potential at low-temperature and low-humidity and the fall of the dark-area potential caused by the lowering of the barrier function at high temperature and high-humidity. This is considered due to the small change on the environmental conditions, of the volume resistivity of the reaction product used in the present invention. The reason is not still clear. However, it is assumed that the electrons participating in the coordination bond between the metal of the organometallic complex compound and the coordinating group contribute greatly to the electroconductivity of the reaction product, thereby the resistivity is less dependent on environmental conditions.

In the present invention, the electric resistance of the interlayer can also be controlled by selecting the structure of the acetal resin, and the structure, the metal valency, and the content of the organometallic complex compound.

The coating liquid for forming the interlayer of the present invention is a solution of an acetal resin and an organometallic complex compound in a solvent. The reaction product thereof is not formed until the solution is heated In the solution, the acetal resin and the organometallic complex compound before the heating are nor in a state which is a complex, but are in a state which is a simple solution thereof. Therefore, the coating liquid or the interlayer will not gel and will maintain consistently a constant viscosity, having a long pot-life.

The resin which reacts with the organometallic complex compound in the present invention is not limited to a single acetal resin but includes a copolymer of an acetal resin and another resin. The monomer to be copolymerized includes olefins, methyl methacrylate, acrylonitrile, acrylic acid and its derivatives, vinyl chloride, styrene, and the like. The ratio of the copolymerization is such that the number of the crosslinkable hydroxyl groups is preferably not less than 5% and more preferably not less than 10%, based on the number of the ethylene chains.

The interlayer of the present invention may further contain electroconductive substances, additives, or other resins.

The electroconductive substance includes powder, foil, or staple of metals such as aluminum, nickel, copper, silver, etc.; electroconductive metal oxides such as antimony oxide, tin oxide, indium oxide, etc.; electroconductive polymer materials such as polypyrrole, polyaniline, polymeric electrolytes, etc.; carbon fiber, carbon black, powdery graphite, organic and inorganic electrolytes, powdery materials coated with an electroconductive substance, and so forth. The mixing ratio (by weight) of the electroconductive substance to the resin used for the interlayer of the present invention is from about 5:1 to about 1:5. This ratio is determined in consideration of the resistivity, surface properties, coating properties, etc. of the electroconductive layer. When the electroconductive substance is powdery, the mixture is prepared by means of a ball mill, a roll mill, a sand mill, an attritor, or the like in a conventional manner.

The additive includes surface active agents, silane coupling agents, titanate coupling agents, silicone oils, silicone levelling agents, and the like.

The resin which may be mixedly used includes thermoplastic resins such as polyvinyl alcohols, polyvinyl alkyl ethers, poly-N-vinylimidazoles, alkylcelluloses, nitrocelluloses, polyacrylate esters, casein, gelatin, polyesters, polyamides, polyethylene oxides, polypropylene oxides, polyamino acid esters, polyvinyl acetates, polycarbonates, polyvinylpyrrolidones, chloroprene rubbers, nitrile rubbers, polymethacrylate esters, polypeptides, polymaleic anhydride, polyacrylamides, polyvinylformals, polyvinylpyridines, polyethylene glycols, polypropylene glycols, polyvinylbutyrals, chlorosulfonated polyethylenes, thermoplastic polyurethanes, and the like; and thermosetting resins such as thermosetting polyurethanes, phenol resins, epoxy resins, and the like.

The thickness of the interlayer of the present invention is decided in consideration of the potential characteristics, the surface state of the electroconductive support, and so forth, and may be in the range of from about 0.1 μm to 50 μm, preferably from 0.5 μm to 5 μm, and, when an electroconductive substance is added, from 1 μm to 30 μm preferably.

A second interlayer may be provided which is mainly constituted of a resin, if necessary, for example, to control the barrier property or other properties. The resin includes polyamides, polyesters, polyurethanes, polyureas, and phenol resins. This second interlayer has preferably a thickness of from 0.1 μm to 5 μm.

The image-holding member of the present invention may have the layer constitution, for example, as below:

(1) (Electroconductive support) / (Interlayer) / (Photosensitive layer), (2) (Electroconductive support) / (Interlayer) / (Dielectric layer), and (3) (Electroconductive support) / (Interlayer) / (Photosensitive layer) / (Dielectric layer).

The present invention is described in detail, taking the above layer constitution (1) as an example.

Figure 2:
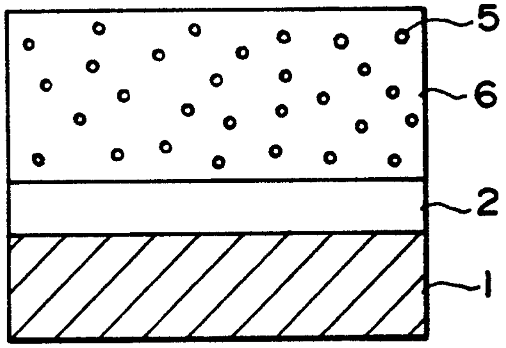
FIG. 2 illustrates another example of the layer constitution of the image-holding member of the present invention.

Examples of constitution of image-holding members of the present invention are illustrated in FIG. 1 and FIG. 2.

In the present invention, the photosensitive layer may be of a lamination type which has functionally separated two layers of a charge-generating layer 3 containing a charge-generating substance 5, and a charge-transporting layer 4 containing a charge-transporting substance (not shown in the drawing), or otherwise may be of a single layer type which has a single layer 6 containing both the charge-generating substance and the charge-transporting substance.

The charge-generating layer 3 may be formed by dispersing a charge-generating substance in a binder resin, and applying the resulting liquid dispersion onto the interlayer 2 of the present invention. The charge-generating substance includes azo dyes such as Sudan Red, Dian Blue, Janus Green B, etc.; quinone pigments such as Algol Yellow, Pyrene Quinone, Indanthrene Brilliant Violet RRP, etc.; quinocyanine pigments; perylene pigments; indigo pigments such as indigo, thioindigo, etc.; bisbenzoimidazole pigments such as Indo Fast Orange toner; phthalocyanine pigments such as copper phthalocyanine, etc.; quinacridone pigments; and the like. The binder resin includes polyvinylbutyral, polystyrene, polyvinyl chloride, polyvinyl acetate, acrylic resins, polyvinylpyrrolidone, methylcellulose, hydroxypropylmethylcellulose, and the like. The thickness of the charge-generating layer is preferably not more than 5 μm, more preferably in the range of from 0.01 μm to 2 μm.

The charge-transporting layer 4 to be provided to overlay or underlay the charge-generating layer 3 may be formed by using a coating liquid prepared by dissolving a charge-transporting substance in a film-forming resin, the charge-transporting substance being selected from polycyclic aromatic compounds such as anthracene, pyrene, phenanthrene, and coronene; nitrogen containing cyclic compounds such as indole, carbazole, oxazole, isoxazole, thiazole, imidazole, pyrazole, oxadiazole, pyrazoline, thiadiazole, and triazole; hydrazone compounds, styryl compounds, and the like. This is because a charge-transfer substance is generally poor in film-forming property owing to its low molecular weight. The resin employed therefor includes polyesters, polysulfones, polycarbonates, polymethacrylate esters, polystyrenes, and the like. The thickness of the charge-generating layer 4 is in the range of from 5 μm to 40 μm, preferably from 10 μm to 25 μm.

Further, the photosensitive layer in the present invention may be a layer of an organic photoconductive polymer such as poly N vinylcarbazole, polyvinylanthraoene, and the like; a vapor-deposited selenium layer, a vapor-deposited selenium-tellurium layer, an amorphous silicon layer, or the like in place of those mentioned above.

In the present invention, a simple resin layer or a resin layer containing electroconductive particles may be laminated as a protecting layer on the photosensitive layer to protect the photosensitive layer from mechanical, electrical, and chemical influences from outside.

The electroconductive support I may be made of any material provided that the material is electroconductive. The examples are molded articles in a shape of a drum, a sheet, or the like made of metals such as aluminum, copper, molybdenum, chromium, nickel, and brass or their alloys; plastic sheets laminated with metal foil, such as of aluminum, or copper: plastic films vapor-deposited with aluminum, indium oxide, tin oxide, or the like; and the aforementioned metals, alloys, and plastic films, or paper sheets coated with an electroconductive substance and a binder.

The above-mentioned layers, and the interlayer 2 of the present invention may be formed by a coating method, such as dip coating, spray coating, spinner coating, roller coating, Meyer bar coating, blade coating, and so forth by using a suitable organic solvent.

The above description is made regarding electrophotographic photosensitive members employing an interlayer of the present invention. The interlayer of the present invention is also effectively used for other image-holding members such as those used for display apparatuses, recording apparatuses, light-printing apparatuses, and engraving apparatuses.

Figure 3:
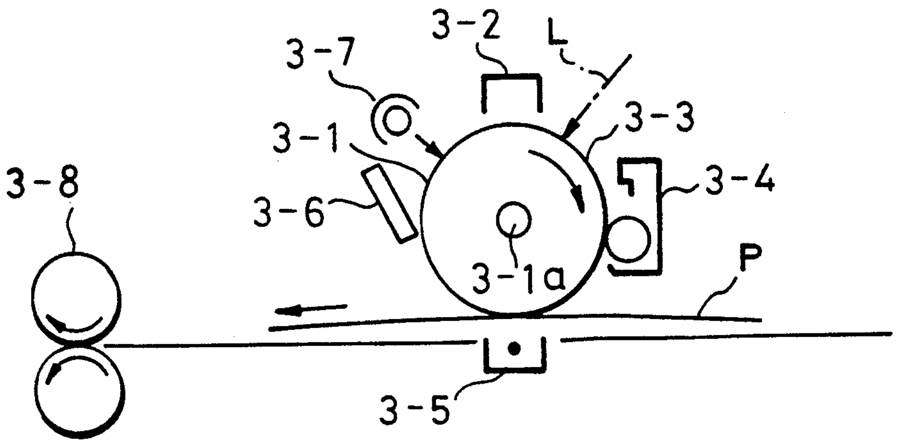
FIG. 3 illustrates the outline of the constitution of an electrophotographic apparatus employing the image-holding member of the present invention.

FIG. 3 shows a schematic diagram of a transfer type electrophotographic apparatus employing the electrophotographic photosensitive member of the present invention.

In FIG. 3, a drum type photosensitive member 3-1 serves as an image carrier, being driven to rotate around the axis 3-1*a* in the arrow direction at a predetermined peripheral speed. The photosensitive member 3-1 is charged positively or negatively at the peripheral face uniformly by an electrostatic charging means 3-2 during the rotation, and then exposed to image-exposure light L (e.g. slit exposure, laser beam-scanning exposure, etc.) at the exposure portion 3-3 with an image-exposure means (not shown in the figure), whereby electrostatic latent images are sequentially formed on the peripheral surface in accordance with the exposed image.

The electrostatic latent image is developed with a toner by a developing means 3-4. The toner-developed images are sequentially transferred by a transfer means 3-5 onto a surface of a transfer-receiving material P which is fed between the photosensitive member 3-1 and the transfer means 3-5 synchronously with the rotation of the photosensitive member 3-1 from a transfer-receiving material feeder not shown in the drawing.

The transfer-receiving material P having received the transferred image is separated from the photosensitive member surface, and introduced to an image fixing means 3-8 for fixation of the image and sent out from the copying machine as a duplicate copy.

The surface of the photosensitive member 3-1, after the image transfer, is cleaned with a cleaning means 3-6 to remove any remaining untransferred toner, and is treated for charge-elimination with a pre-exposure means 3-7 for repeating image formation.

The generally employed charging means 3-2 for uniformly charging the photosensitive member 3-1 is a corona charging apparatus. The generally employed transfer means 3-5 is also a corona charging means. In the electrophotographic apparatus, two or more of the constitutional elements of the above described photosensitive member, the developing means, the cleaning means, etc. may be integrated into one apparatus unit, which may be made removable from the main body of the apparatus. For example, at least one of an electrostatic charging means, a developing means, and a cleaning means is combined with the photosensitive member into one unit which is removable from the main body of the apparatus by aid of a guiding means such as a rail in the main body of the apparatus. An electrostatic charging means and/or a developing means may be combined with the aforementioned apparatus unit.

In the case where the electrophotographic apparatus is used as a copying machine or a printer, the optical image exposure light L is projected onto the photosensitive member as reflected light or transmitted light from an original copy, or otherwise the information read out by a sensor from an original is signalized and according to the signal light is projected onto a photosensitive member by scanning with a laser beam, driving an LED array, or driving a liquid crystal shutter array.

Figure 4:
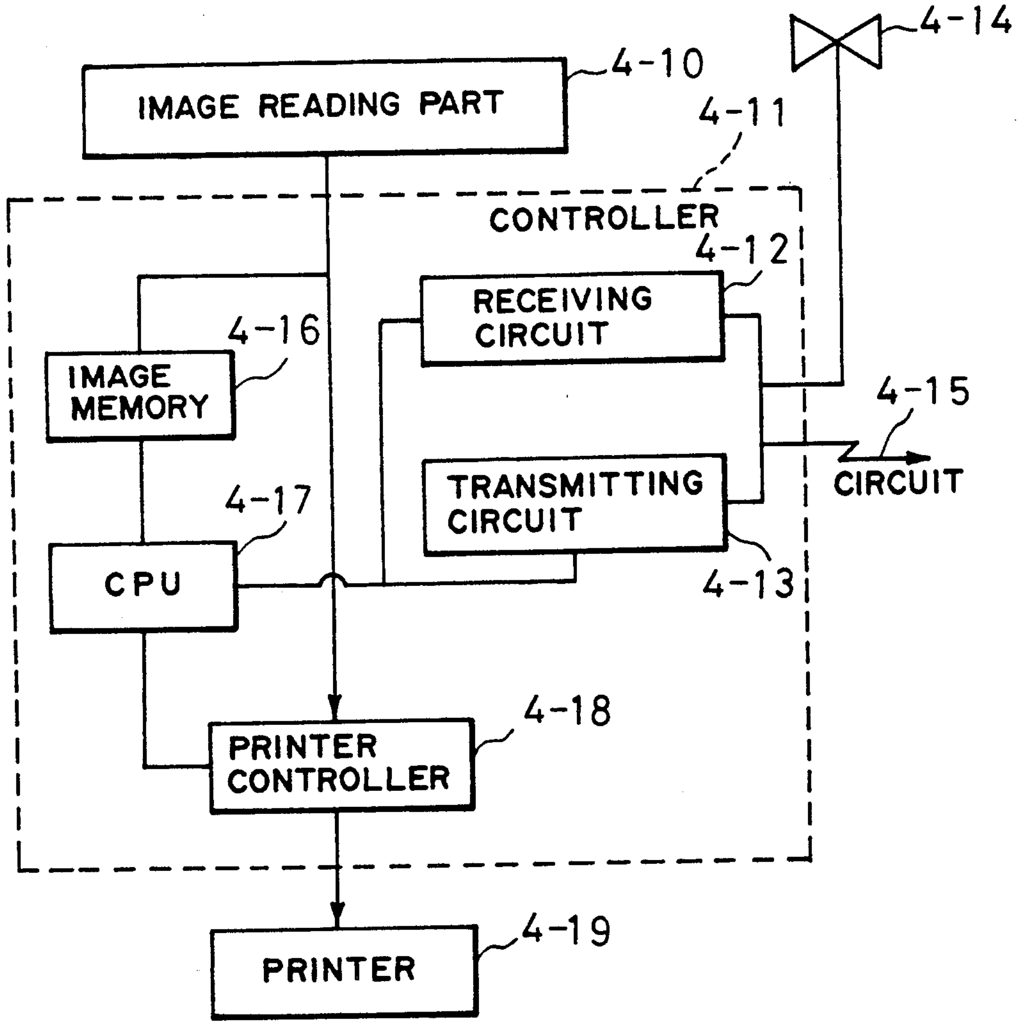
FIG. 4 illustrates an example of a block diagram of a facsimile employing the image-holding member of the present invention.

In the case where the electrophotographic apparatus is used as a printer of a facsimile machine, the optical image exposure light L is for printing the received data. FIG. 4 is a block diagram of an example of this case.

A controller 4-11 controls an image reading part 4-10 and a printer 4-19. The entire of the controller 4-11 is controlled by a CPU 4-17. Readout data from the image reading part is transmitted through a transmitting circuit 4-13 to the other communication station. Data received from the other communication station is transmitted through a receiving circuit 4-12 to a printer 4-19. The image data is stored in image memory. A printer controller 4-18 controls a printer 4-19. The numeral 4-14 denotes a telephone set.

The image received through a circuit 4-15, namely image information from a remote terminal connected through the circuit, is demodulated by the receiving circuit 4-12, treated for decoding of the image information in CPU 4 17, and successively stored in the image memory 4-16. When at least one page of image information has been stored in the image memory 4-16, the images are recorded in such a manner that the CPU 4-17 reads out the one page of the image information from the image memory 4-16, and sends out the decoded one page of information to the printer controller 4-18, which controls the printer 4-19 on receiving the one page of information from CPU 4-17 to record the image information.

During recording by the printer 4-19, the CPU 4-17 receives the information in the subsequent page.

Images are received and recorded in the manner as described above.

The present invention is described in more detail by reference to examples. The term "part" in the Examples is based on weight unless otherwise mentioned.

EXAMPLE 1

A coating liquid for electroconductive layer was prepared by dispersing 40 parts of electroconductive powdery titanium oxide coated with tin oxide containing 10% of antimony oxide, 25 parts of a phenol resin, 20 parts of methylcellosolve, 5 parts of methanol, and 0.002 part of silicone oil (polydimethylsiloxane-polyoxyalkylene copolymer, weight average molecular weight: 3000) by means of a sand mill using glass beads of 1 mm in diameter for 2 hours.

The above coating liquid was applied on an aluminum cylinder (30 mm in diameter, 260 mm in length) by dip coating. The applied coating liquid was dried at 140° C. for 30 minutes to form an electroconductive layer 20 μm thick.

Separately, a coating liquid for the interlayer was prepared by dissolving 10 parts of polyvinylbutyral (butyralation degree: 65% , weight-average molecular weight: 50,000), and 2 parts of the exemplified organometallic complex compound No. 3 into 90 parts of methyl ethyl ketone. This coating liquid was applied on the electroconductive layer prepared above by dip coating, and was dried at 150° C. for one hour to form the interlayer of 1 μm thick.

A film of the coating liquid for &he interlayer was formed on a KBr plate in the same manner as above. The IR absorption spectrum of the film was measured, and the spectrum showed lower absorption peak of the hydroxy group than that of the single polyvinylbutyral.

Subsequently, 3 parts of the disazo pigment represented by the structural formula below:

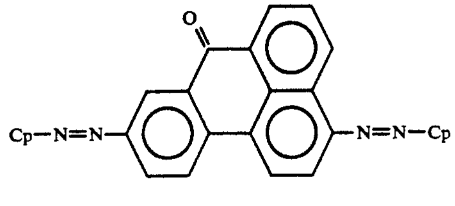

-continued

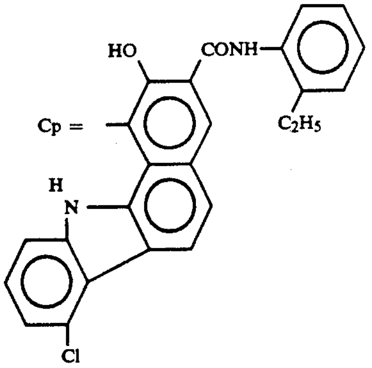

2 parts of polymethyl methacrylate (weight-average molecular weight:20,000), and 35 parts of cyclohexanone were dispersed by means of a sand mill using glass beads of 1 mm in diameter for 6 hours. Thereto, 60 parts of methyl ethyl ketone was added, thus forming a liquid dispersion for charge-generating layer. This liquid dispersion was applied on the above-prepared interlayer by dip coating, and dried at 80° C. for 20 minutes to form a charge-generating layer of 0.15 μm thick.

Then, 11 parts of the styryl compound represented by the structural formula below:

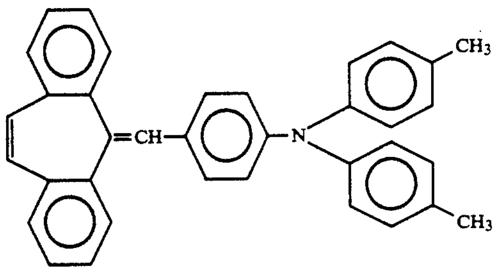

and 10 parts of polycarbonate (weight-average molecular weight: 46,000) were dissolved in a solvent mixture of 20 parts of dichloromethane and 40 parts of monochlorobenzene. The solution was applied on the above charge-generating layer by dip coating, and dried at 120° C. for 60 minutes to form a charge-transporting layer of 18 μm thick.

The electrophotographic photosensitive member prepared as above was mounted on a reversal development type laser printer (LBP-SX, made by Canon K.K.), and the electrophotographic properties were evaluated under the environmental conditions of a normal temperature and humidity (23° C., 50% RH), and a high temperature and humidity (30° C., 85% RH).

As a result, the photosensitive member of Example 1 gave a large difference between dark-area potential ($V_D$) and light area potential ($V_L$) with sufficient potential contrast, and with stable dark-area potential ($V_D$) even at high temperature and humidity, giving an image of high quality without black dots nor fogging.

EXAMPLES 2, 3, 4, 5, AND 6

Electrophotographic photosensitive members were prepared and evaluated in the same manner as in Example 1 except that the exemplified organometallic complex compound No.4, No.19, No.18, No.29, or No.38 was used in place of the exemplified organometallic complex compound No.3. The results are shown in Table 1.

EXAMPLE 7

An electrophotographic photosensitive member was prepared and evaluated in the same manner as in Example 1 except that polyvinylbenzal (benzalation degree: 63%, weight-average molecular weight: 58,000) was used as the acetal resin and exemplified organometallic complex compound No.8 was used as the organometallic complex compound. The results are shown in Table 1.

EXAMPLES 8, 9, 10, 11, AND 12

Electrophotographic photosensitive members were prepared and evaluated in the same manner as in Example 7 except that the exemplified organometallic complex compound No.10, No.19, No.20, No.40, or No.55 was used in place of the exemplified organometallic complex compound No.8. The results are shown in Table 1.

COMPARATIVE EXAMPLE 1

Formation of an electrophotographic photosensitive member was tried in the same manner as in Example 1 except that the organometallic complex compound was not used. However, during coating application of the charge-generating layer, the interlayer dissolved out so that the intended photosensitive member could not be obtained.

COMPARATIVE EXAMPLE 2

An electrophotographic photosensitive member was prepared and evaluated in the same manner as in Example 1 except that N-methoxymethylated nylon (Toresin, made by Teikoku Kagaku K.K.) was use in place of the polyvinylbutyral. The results are shown in Table 1.

TABLE 1

| | 23° C., 50% RH | | 30° C., 85% RH | |
|---|---|---|---|---|
| | Dark-area potential $V_D$(−V) | Light-area potential $V_L$(−V) | Dark-area potential $V_D$(−V) | Image quality |
| Example 1 | 715 | 195 | 710 | Good |
| Example 2 | 720 | 190 | 715 | Good |
| Example 3 | 715 | 220 | 705 | Good |
| Example 4 | 720 | 210 | 710 | Good |
| Example 5 | 680 | 210 | 670 | Good |
| Example 6 | 690 | 200 | 680 | Good |
| Example 7 | 695 | 190 | 690 | Good |
| Example 8 | 715 | 195 | 700 | Good |
| Example 9 | 695 | 210 | 680 | Good |
| Example 10 | 715 | 205 | 700 | Good |
| Example 11 | 685 | 215 | 675 | Good |
| Example 12 | 695 | 210 | 690 | Good |
| Comparative Example 1 | No electrophotographic photosensitive member obtained | | | |
| Comparative Example 2 | 705 | 230 | 505 | Black dots appeared |

EXAMPLE 13

A coating liquid for interlayer formation was prepared by dissolving 10 parts of the acetal resin having the structure represent ®d by the formula below:

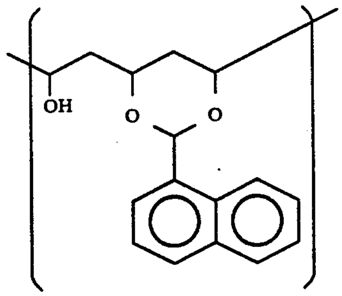

(remaining ratio of hydroxy group: 35%, weight-average molecular weight: 48,000), and 3 parts of the exemplified compound No.13 as the organometallic complex compound in 90 parts of methyl ethyl ketone. This coating liquid was applied onto an aluminum cylinder (30 mm in diameter and 360 mm in length) by dip coating, and dried at 150° C. for one hour to form an interlayer of 1.5 μm thick.

A liquid dispersion for charge-generating layer formation was prepared by dispersing 4 parts of τ-type phthalocyanine pigment, 2 parts of polyvinylbutyral (butyralation degree: 70%, weight-average molecular weight: 24,000), and 34 parts of cyclohexanone for 5 hours by means of a sand mill with glass beads of 1 mm in diameter, and adding thereto 60 parts of tetrahydrofuran. This liquid dispersion was applied on the above interlayer by dip coating, and dried at 90° C. for 15 minutes to form a charge-generating layer of 0.20 μm thick.

A solution for charge-transporting layer formation was prepared by dissolving 10 parts of the styryl compound used in Example 1, 10 parts of polycarbonate (weight-average molecular weight: 20,000) in a solvent mixture of 15 parts of dichloromethane and 45 parts of monochlorobenzene. This solution was applied on the above charge-generating layer by dip coating, and was dried at 120° C. for 60 minutes to form a charge-generating layer of 20 μm thick.

The electrophotographic photosensitive member thus prepared was mounted on a plain paper copying machine (NP-4835, made by Canon K.K.), and was tested for the electrophotographic properties under the environment of a low temperature and a low humidity (15%, 10%RH). As shown in Table 2. this photosensitive member gives large difference between the dark-area potential ($V_D$) and the light area potential, giving sufficient potential contrast. The increase of light area potential ($V_L$) was small and the images were stably obtained during a successive 1000 sheet image formation.

EXAMPLES 14, 15, 16, 17, AND 18

Electrophotographic photosensitive members were prepared and evaluated in the same manner as in Example 13, except that the exemplified organometallic complex compound No.7, No.23, No.24, No.56, or No.6 was used in place of the exemplified organometallic complex compound No.13. The results are shown in Table 2.

COMPARATIVE EXAMPLE 3

An electrophotographic photosensitive member was prepared and evaluated in the same manner as in Example 13 except that alcohol-soluble nylon copolymer (CM-8000, made by Toray Industries, Inc.) was used in place of the acetal resin. The results are shown in Table 2.

TABLE 2

| | Initial stage | | After successive 1000 sheets of copying | |
|---|---|---|---|---|
| | Dark-area potential $V_D$(−V) | Light-area potential $V_L$(−V) | Light-area potential $V_L$(−V) | Image quality |
| Example 13 | 700 | 190 | 195 | Good |
| Example 14 | 710 | 195 | 205 | Good |
| Example 15 | 700 | 220 | 230 | Good |
| Example 16 | 710 | 210 | 215 | Good |
| Example 17 | 700 | 220 | 225 | Good |
| Example 18 | 695 | 230 | 235 | Good |
| Comparative Example 3 | 695 | 225 | 410 | Fogging occurred |

EXAMPLE 19

A coating liquid for interlayer was prepared by dispersing 30 parts of electroconductive powdery titanium oxide coated with tin oxide containing 10% of antimony oxide, 20 parts of powdery butile type titanium oxide, 20 parts of polyvinylbuyral (butyralation degree: 72%, weight-average molecular weight 20,000), 5 parts of the exemplified organometallic complex compound No. 15, and 180 parts of methyl ethyl ketone for one hour by means of a sand mil with glass beads of 1 mm in diameter. This coating liquid was applied onto an aluminum cylinder (60 mm in diameter, and 260 mm in length) by dip coating, and was dried at 160° C. for one hour to form an interlayer of 10 μm thick.

Then, 5 parts of N-methoxymethylated 6-nylon (Toresin, made by Teikoku Kagaku K.K.) was dissolved in 95 parts of methanol. This solution was applied onto the above interlayer by dip coating, and was dried at 80° C. for 10 minutes to form a second interlayer of 0.2 μm thick.

Subsequently, a liquid dispersion for charge-generating layer was prepared by dispersing 2 parts of disazo pigment represented by the structural formula below:

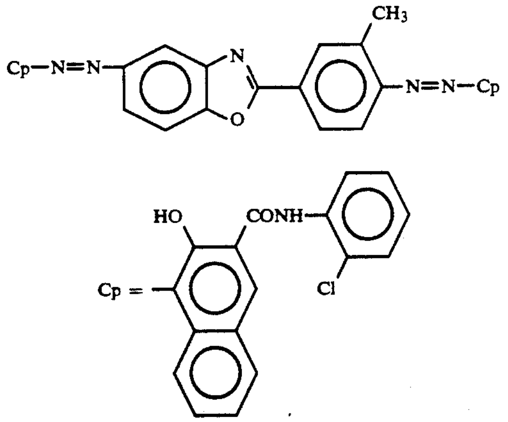

one part of polyvinyl butyral (butyralation degree: 70 weight-average molecular weight: 18,000), and 30 parts of cyclohexanone for 24 hours by means of a sand mill employing glass beads of 1 mm in diameter, and adding thereto 65 parts of methyl ethyl ketone. This liquid dispersion was applied onto the above second interlayer, and dried at 80° C. for 20 minutes to form a charge-generating layer of 0.15 μm.

Further, a solution for a charge-generating layer was prepared by dissolving 9.5 parts of the hydrazone compound represented by the structural formula below:

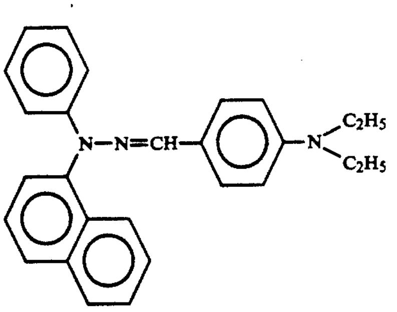

and 10 parts of polycarbonate (weight-average molecular weight: 36,000) in a solvent mixture of 20 parts of dichloromethane and 40 parts of monochlorobenzene. This solution was applied onto the above charge-generating layer by dip coating, and was dried at 120° C. for 60 minutes to form a charge-transporting layer of 25 μm thick. The resulting electrophotographic photosensitive member was evaluated in the same manner as in Example 13. The results are shown in Table 3.

EXAMPLE 20

An electrophotographic photosensitive member was prepared and evaluated in the same manner as in Example 19 except that the second interlayer was not provided. The results are shown in Table 3.

EXAMPLE 21

An electrophotographic photosensitive member was prepared and evaluated in the same manner as in Example 19 except that the exemplified organometallic complex compound No.25 was used in place of the exemplified organometallic complex compound No.15. The results are shown in Table 3.

EXAMPLE 22

An electrophotographic photosensitive member was prepared and evaluated in the same manner as in Example 21 except that the second interlayer was not provided. The results are shown in Table 3.

EXAMPLE 23

An electrophotographic photosensitive member was prepared and evaluated in the same manner as in Example 19 except that the exemplified organometallic complex compound No.63 was used in place of the exemplified organometallic complex compound No.15. The results are shown in Table 3.

EXAMPLE 24

An electrophotographic photosensitive member was prepared and evaluated in the same manner as in Example 23 except that the second interlayer was not provided. The results are shown in Table 3.

COMPARATIVE EXAMPLE 4

An electrophotographic photosensitive member was prepared and evaluated in the same manner as in Example 19 except that the organic aluminum complex compound was not used. The results are shown in Table 3.

COMPARATIVE EXAMPLE 5

An electrophotographic photosensitive member was prepared and evaluated in the same manner as in Example 20 except that the organic aluminum complex compound was not used. After successive 1000 sheets of image formation, this member came to fail to give sufficient potential contrast required for image formation. The results are shown in Table 3.

TABLE 3

| | Second inter-layer | Initial stage Dark-area potential $V_D(-V)$ | Initial stage Light-area potential $V_L(-V)$ | After successive 1000 sheets of copying Light-area potential $V_L(-V)$ | After successive 1000 sheets of copying Image quality |
|---|---|---|---|---|---|
| Example 19 | Provided | 710 | 195 | 200 | Good |
| Example 20 | Not provided | 700 | 185 | 195 | Good |
| Example 21 | Provided | 710 | 215 | 220 | Good |
| Example 22 | Not provided | 700 | 220 | 225 | Good |
| Example 23 | Provided | 710 | 215 | 220 | Good |
| Example 24 | Not provided | 700 | 215 | 225 | Good |
| Comparative Example 4 | Provided | 715 | 220 | 505 | Fogging occurred |
| Comparative Example 5 | Not provided | 430 | 205 | Evaluation infeasible | |

What is claimed is:

1. An image-holding member, comprising an electroconductive support, a resin layer formed on the support, and an interlayer provided between the support and the resin layer, said interlayer being formed by applying a solution comprising an acetal resin, an organometallic complex compound and an electroconductive substance over the electroconductive support and thereafter reacting the acetal resin and the organometallic complex compound.

2. An image-holding member according to claim 1, wherein the metal of the organometallic complex compound is aluminum or titanium.

3. An image-holding member according to claim 2, wherein the metal of the organometallic complex compound is aluminum.

4. An image-holding member according to claim 1, wherein the organometallic complex compound has the structure selected from the group consisting of one of the formulas (I) to (XII):

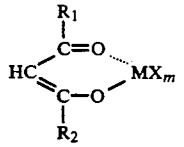
(I)

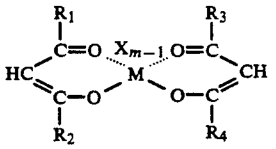
(II)

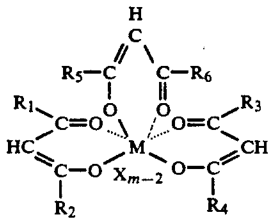
(III)

-continued

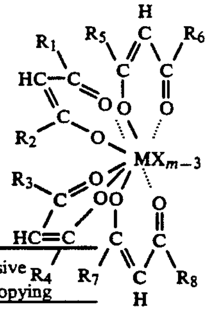
(IV)

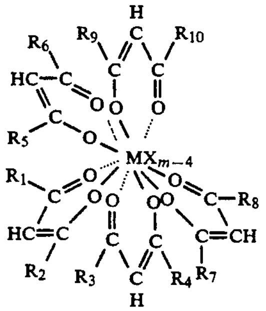
(V)

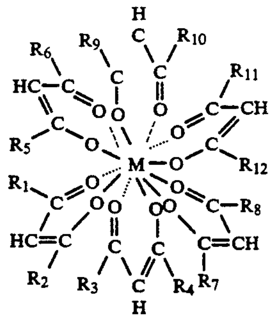
(VI)

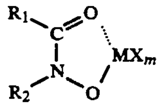
(VII)

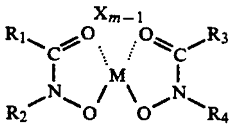
(VIII)

-continued (IX)

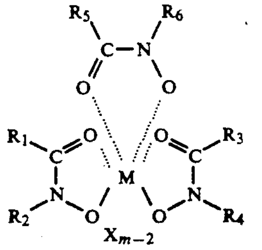

(X)

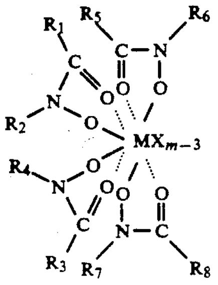

(XI)

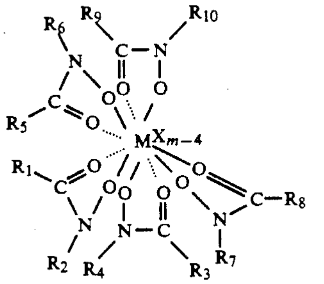

(XII)

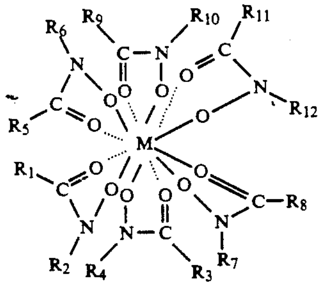

wherein M is a metal atom selected from the group consisting of aluminum, titanium, silver, barium, cobalt, chromium, copper, europium, iron, potassium, lanthanum, magnesium, manganese, molybdenum, nickel, palladium, radon, tin, lead, vanadium, zinc, and zirconium, or an oxide, a sulfide, or a halide of the metal; $R_1$, $R_2$, $R_3$, $R_4$, $R_5$, $R_6$, $R_7$, $R_8$, $R_9$, $R_{10}$, $R_{11}$, and $R_{12}$, are independently a hydrogen atom, an alkyl group, an alkenyl group, an alkoxy group, an aryl group, a cycloalkyl group, a cycloalkenyl group or an $OR_{13}$ group, where $R_{13}$ is alkenyl, aryl, or cycloalkyl, which groups may be substituted; X is water, a carbonyl group, an alkyl group, an alkoxy group, a cycloalkyl group, or a cycloalkenyl group, which may be substituted; and m is 0, 1, 2, 3, 4, or 5.

5. An image-holding member according to claim 4, wherein the M is aluminum or titanium.

6. An image-holding member according to claim 5, wherein the M is aluminum.

7. An image-holding member according to claim 1, wherein the resin layer is a photosensitive layer or a dielectric layer.

8. An image-holding member according to claim 7, wherein the resin layer is a photosensitive layer.

9. An image-holding member according to claim 7, wherein the photosensitive layer comprises a charge-generating layer and a charge-transporting layer.

10. An image-holding member according to claim 9, wherein the image-holding member has an electroconductive support, an interlayer, a chargegenerating layer, and a charge-transporting layer in this sequence.

11. An image-holding member according to claim 9, wherein the image-holding member has an electroconductive support, an interlayer, a charge transporting layer, and a charge-generating layer in this sequence.

12. An image-holding member according to claim 7, wherein the photosensitive layer is a single layer.

13. An image-holding member according to claim 1, wherein the interlayer contains an additive or additives selected from the group consisting of surface active agents, silane coupling agents, titanate coupling agents, silicone oils, and silicone levelling agents.

14. An image-holding member according to claim 1, wherein the image-holding member has a second interlayer on said interlayer.

15. An image-holding member according to claim 8, wherein the image-holding member has a protecting layer on the photosensitive layer.

16. An electrophotographic apparatus, comprising an image-holding member, a means for forming an electrostatic latent image, a means for developing the electrostatic latent image formed, and a means for transferring a developed image onto a transfer-receiving material; said image-holding member comprising an electroconductive support, a resin layer formed on the support, and an interlayer provided between the support and the resin layer, the interlayer being formed by applying a solution comprising an acetal resin, an organometallic complex compound and an electroconductive substance over the electroconductive support and thereafter reacting the acetal resin and the organometallic complex compound.

17. A device unit comprising an image-holding member, a charging means, and a cleaning means, said image-holding member comprising an electroconductive support, a resin layer formed on the support, and an interlayer provided between the support and the resin layer, the interlayer being formed by applying a solution comprising an acetal resin, an organometallic complex compound and an electroconductive substance over the electroconductive support and thereafter reacting the acetal resin and the organometallic complex compound; and the unit holding the image-holding member, the charging means, and the cleaning means integrally, and being removable from the main body of an electrophotographic apparatus.

18. A device unit according to claim 17, wherein the unit comprises a developing means.

19. A facsimile machine, comprising an electrophotographic apparatus and an information-receiving means for receiving image information from a remote terminal; said electrophotographic apparatus comprising an image-holding member, said image-holding member comprising an electroconductive support, a resin layer formed on the support, and an interlayer provided between the support and the resin layer, the interlayer being formed by applying a solution comprising an acetal resin, an organometallic complex compound and an electroconductive substance over the electroconductive support and thereafter reacting the acetal resin and the organometallic complex compound.

* * * * *

UNITED STATES PATENT AND TRADEMARK OFFICE

CERTIFICATE OF CORRECTION

PATENT NO. : 5,270,141

DATED : December 14, 1993

INVENTOR(S) : NORIKO OHTANI ET AL. Page 1 of 7

It is certified that error appears in the above-identified patent and that said Letters Patent is hereby corrected as shown below:

COLUMN 1

Line 21, "area . potential" should read --area potential--.

COLUMN 3

Line 9, "&he" should read --the--.
Line 31, "group" should read --group.--.

COLUMN 4

Form (IX) " 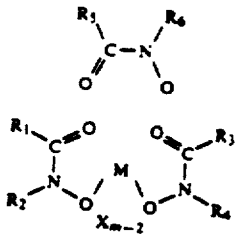 " should read -- 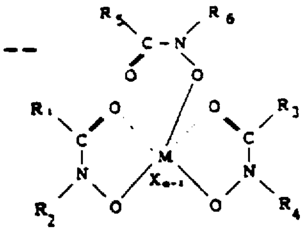 --.

COLUMN 5

Line 47, "cloalkyl" should read --cycloalkenyl--.

UNITED STATES PATENT AND TRADEMARK OFFICE

CERTIFICATE OF CORRECTION

PATENT NO. : 5,270,141

DATED : December 14, 1993

INVENTOR(S) : NORIKO OHTANI ET AL.

It is certified that error appears in the above-identified patent and that said Letters Patent is hereby corrected as shown below:

COLUMN 14

Line 19, "Bx-1," should read --BX-1,--.
Line 45, "arom" should read --atom--.
Line 46, "r •action" should read --reaction--.
Line 48, "takes" should read --take--.

COLUMN 15

Line 31, "heated" should read --heated.--.
Line 32, "nor" should read --not--.

COLUMN 17

Line 26, "thraoene," should read --thracene,--.

COLUMN 18

Line 68, "CPU 4 17," should read --CPU 4-17,--.

COLUMN 19

Line 50, "&he" should read --the--.

COLUMN 21

Line 68, "represent •d" should read --represented--.

UNITED STATES PATENT AND TRADEMARK OFFICE
CERTIFICATE OF CORRECTION

PATENT NO. : 5,270,141

DATED : December 14, 1993

INVENTOR(S) : NORIKO OHTANI ET AL.

It is certified that error appears in the above-identified patent and that said Letters Patent is hereby corrected as shown below:

COLUMN 22

Line 60, "No. 6" should read --No. 61--.

COLUMN 23

Line 24, "polyvinylbuyral" should read --polyvinylbutyral--.

COLUMN 25

Line 7, "came to fail" should read --failed--.

Tab 3, "

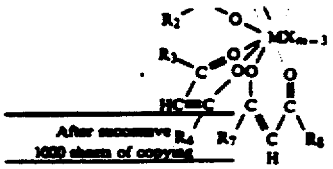

| After successive 1000 sheets of copying | |
|---|---|
| -ight-area potential $V_L$(-V) | Image quality |
| 200 | Good |
| 195 | Good |
| 220 | Good |
| 225 | Good |
| 220 | Good |
| 225 | Good |
| 505 | Fogging occurred Evaluation infeasible |

" should read --

| After successive 1000 sheets of copying | |
|---|---|
| Light-area potential $V_L$(-V) | Image quality |
| 200 | Good |
| 195 | Good |
| 220 | Good |
| 225 | Good |
| 220 | Good |
| 225 | Good |
| 505 | Fogging occurred Evaluation infeasible |

--.

UNITED STATES PATENT AND TRADEMARK OFFICE
CERTIFICATE OF CORRECTION

PATENT NO. : 5,270,141

DATED : December 14, 1993

INVENTOR(S) : NORIKO OHTANI ET AL.

It is certified that error appears in the above-identified patent and that said Letters Patent is hereby corrected as shown below:

COLUMN 26

Form (IV), " 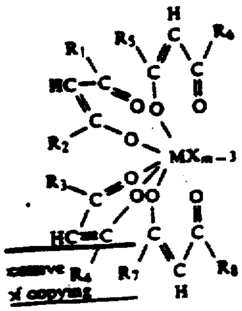 " should read -- 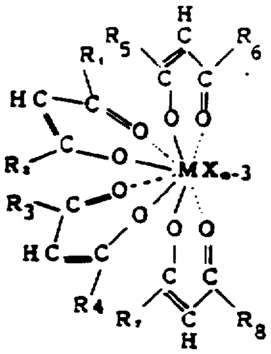 --.

Form (V), " 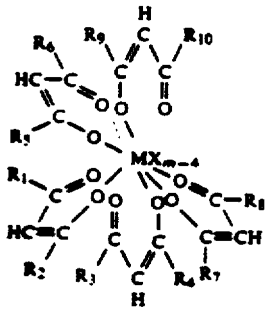 " should read -- 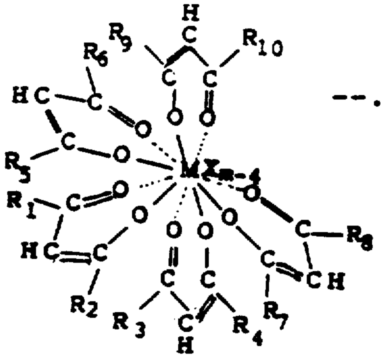 --.

UNITED STATES PATENT AND TRADEMARK OFFICE
CERTIFICATE OF CORRECTION

PATENT NO. : 5,270,141

DATED : December 14, 1993

INVENTOR(S) : NORIKO OHTANI ET AL. Page 5 of 7

It is certified that error appears in the above-identified patent and that said Letters Patent is hereby corrected as shown below:

COLUMN 26, continued

Form (VI), " 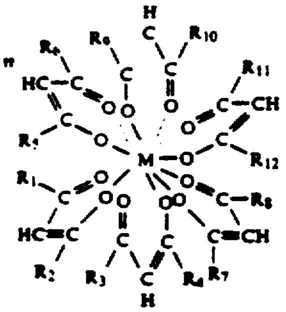 " should read -- 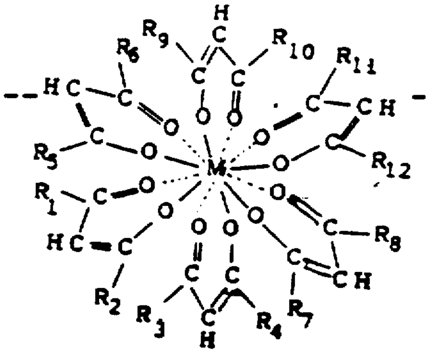 --.

Form (IX) " 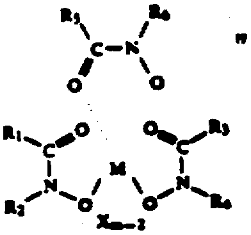 " should read -- 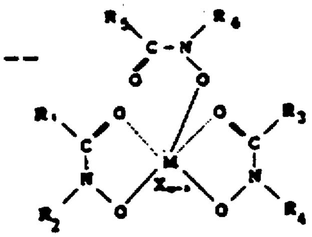 --.

UNITED STATES PATENT AND TRADEMARK OFFICE
CERTIFICATE OF CORRECTION

PATENT NO. : 5,270,141

DATED : December 14, 1993

INVENTOR(S) : NORIKO OHTANI ET AL.

It is certified that error appears in the above-identified patent and that said Letters Patent is hereby corrected as shown below:

COLUMN 26, continued

Form (XI), " 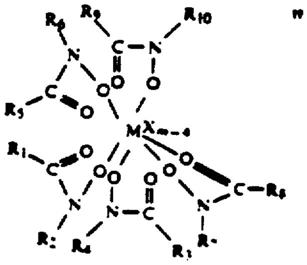 " should read -- 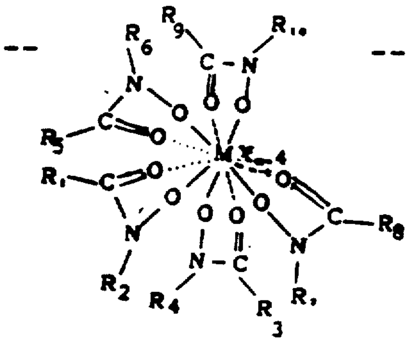 --.

Form (XII), " 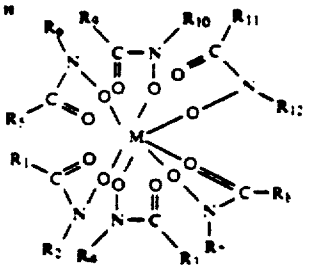 " should read -- 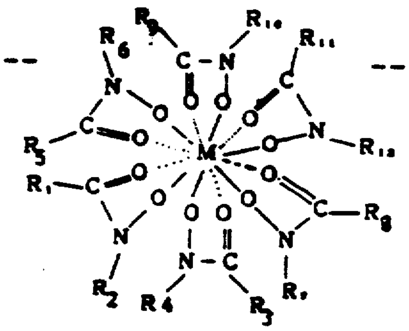 --.

UNITED STATES PATENT AND TRADEMARK OFFICE

CERTIFICATE OF CORRECTION

PATENT NO. : 5,270,141

DATED : December 14, 1993

INVENTOR(S) : NORIKO OHTANI ET AL.

It is certified that error appears in the above-identified patent and that said Letters Patent is hereby corrected as shown below:

COLUMN 28

Line 8, "chargegenerating" should read --charge-generating--.

Signed and Sealed this

Fourth Day of October, 1994

Attest:

BRUCE LEHMAN

Attesting Officer

Commissioner of Patents and Trademarks